March 23, 1965 E. W. PAESSLER 3,175,153
TERMINAL CONTACTING FIXTURE UTILIZING TORSIONAL
DEFLECTABLE CONTACTING ELEMENTS
Filed Dec. 23, 1960
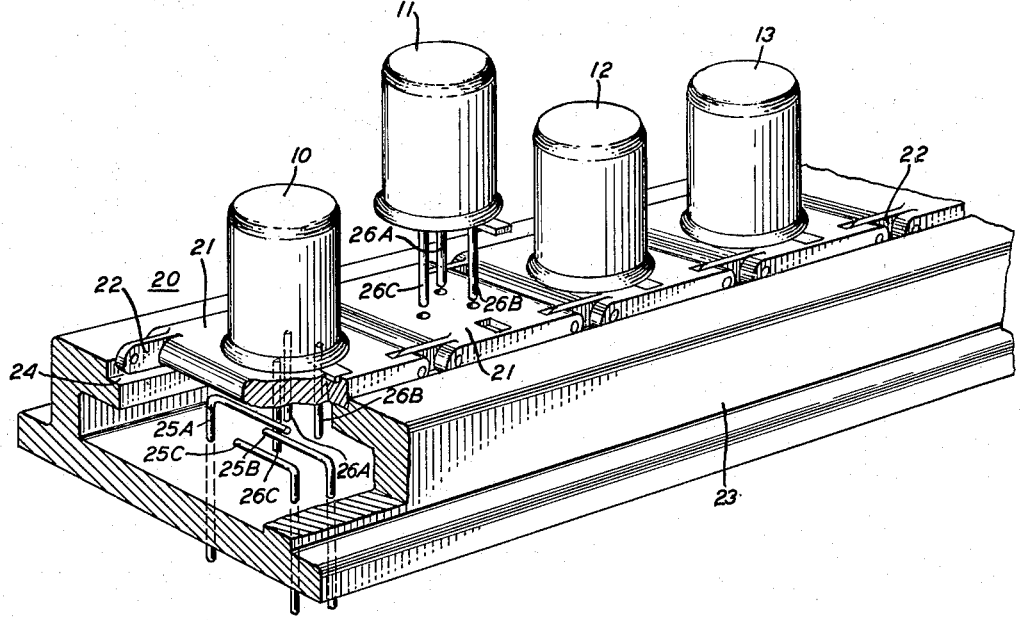
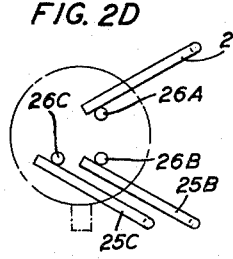
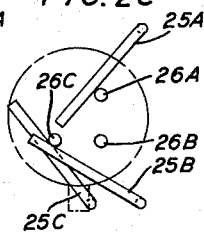
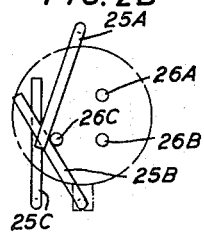
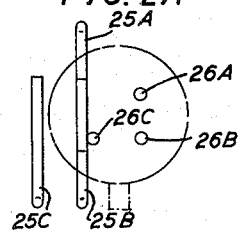
INVENTOR
E. W. PAESSLER
ATTORNEY 3,175,153
TERMINAL CONTACTING FIXTURE UTILIZING TORSIONAL DEFLECTABLE CONTACTING ELEMENTS
Eric W. Paessler, Hackensack, N.J., assignor to Bell Telephone Laboratories, Incorporated, New York, N.Y., a corporation of New York
Filed Dec. 23, 1960, Ser. No. 78,148
3 Claims. (Cl. 324—158)

This invention relates to an electrical connector which is particularly adapted for making temporary connections to the terminals of an electrical device or unit that is being conveyed through a testing or processing station.

In the manufacturing and processing of electrical components, it is often desirable or necessary to make electrical connections to each component for a short time in order to perform a conditioning or testing operation. For example, transistors, after assembly, may be passed through a station for testing their electrical characteristics. For convenience of illustration, the present invention is disclosed by way of mechanisms employed in a transistor testing station at which temporary connection is made to the individual contact pins of each of a plurality of transistors while it is at this station. The transistors are transported by a carrier belt or other suitable means, such as trays.

An object of the invention is to expedite the making of temporary connections to the terminals of electrical devices passing through a given station.

A further object is to make each connection in such a manner that a good contact to each terminal results.

A feature of the invention resides in a contactor array having at least one contactor in the path of each one of the terminals of a passing electrical device. The contactors are deflectable by the moving terminals and so constructed and arranged that at some stage of the device passage its terminals are each in contact with only one contactor.

A further feature of the invention lies in a contactor array in which each contactor makes wiping contact with a corresponding terminal.

In accordance with another feature of the invention the construction and arrangement of the contactors is such that a fair amount of misalignment between contactors and terminals may be tolerated.

Other and further objects and features of this invention will appear more fully and clearly in the ensuing description of an exemplary embodiment thereof as illustrated by the accompanying drawings in which:

FIG. 1 is a perspective view of the contact making and transporting means with parts broken away to show internal details; and FIGS. 2A through 2D show diagrammatically the position of the contactors with respect to device terminals at different stages of the passage of the devices through a given station from right to left.

In FIG. 1, the transistors 10, 11, 12 and 13 are shown with the fixture 20. The device 10 is shown in the position of first contact, as diagrammed in FIG. 2A. Although the transistor 11 would ordinarily be mounted in the conveyer, it has been shown in a raised position in order that some of the details of it and of the conveyer may be better seen.

The conveyer may, as shown, comprise a plurality of device carriers 21 connected into a chain by links 22. The carriers 21 are supported by the base 23 and are guided by the rabbeted grooves therein, one of which is indicated at 24.

The contactors 25A, 25B, and 25C may be L-shaped and secured in the bottom of the base 23 as shown, or may be straight and project from the sides of the channel. The contactors are located in accordance with the arrangement of the terminals of the device being contacted, so that contactors 25A, 25B, and 25C will at the proper time be respectively in contact with the terminals 26A, 26B, and 26C.

With the horizontal portions of contactors 25A and 25B in the same vertical plane as in FIG. 2A, the terminal pin 26C will deflect them to a position as shown in FIG. 2B, and pick up the contactor 25C. The contactor 25A will be dropped by the pin 26C and make contact with the pin 26A as in FIG. 2C. When sufficient progress has been made, the contactor 25B will transfer to the pin 26B and the individual connectors will be as shown in FIG. 2D. The conveyer may be stopped at this time to allow the making of such test or process steps as may be required. If the function to be performed is essentially momentary in nature it may not be necessary to stop the conveyer.

Further progress of the transistor will allow all of the contactors to return to their undeflected position as shown in FIG. 2A. During this part of the operation, the contactor 25C will be brushed by the terminal 26B merely as an incident of the continued movement of the transistors.

Various modifications of the handling equipment may be made to fit a particular testing or processing situation. One equipment for making several tests on a transistor, such tests requiring several seconds, is equipped with drive and control means that stop a transistor at the test station for the required time. The resumption of movement may be automatically or manually initiated. The rate of advance of the conveyer may be made slow or rapid as conditions require.

What is claimed is:

1. Apparatus for successively making temporary connection to the terminal pins of each of a plurality of electrical devices that are being transported through a test station, said pins protruding in parallel relation from a device transporting strip, said apparatus comprising a plurality of L-shaped deflectable contactors each for connecting with a respective one of said terminal pins and each having a supporting branch secured to a base at the station and a contacting branch projecting at right angles therefrom and into the path of at least one terminal pin of the electrical device, whereby upon contact with a terminal pin each said contacting branch deflects thereby creating a torsional force in said supporting branch that opposes the deflection of said contacting branch, said torsional force restoring said contacting branch toward its undeflected position upon the passing of said terminal pin and each of said contactors being secured to said base at a point where, when said device is at the test station, the horizontal distance of each supporting branch to the corresponding contacting terminal is slightly less than the length of the respective contacting branch, whereby at one stage of the device passage through the station each pin is simultaneously in contact with a different one of the contactors.

2. Apparatus for making connection to the terminal pins of electrical devices that are being transported through a given station, said pins protruding from a device transporting strip, said apparatus comprising a plurality of deflectable contactors each having a supporting branch secured to a base at the station and a contacting branch with an end portion and forming an angle with said supporting branch, said contacting branch projecting into the path of at least one terminal pin of the electrical device for wiping contact with a side of said pin whereby upon contact with a terminal pin each said contacting branch deflects thereby creating a torsional force in said supporting branch that opposes the deflection of said contacting branch, said torsional force restoring said contacting branch toward its undeflected position upon the passing of said terminal pin and each of said supporting branches being fixed to said base at a point whereby said end portions of each said contacting branch contact simultaneously the corresponding terminal pins with substantially equal force when said device is at said station, said supporting branches having substantially equal torsional forces therein at such time.

3. Contacting means for making temporary, simultaneous connection to a plurality of spaced parallel terminal pins extending from the body of an electrical device that is being transported through a station including the contacting means, comprising a traveler for mounting a plurality of like devices with their terminal pins projecting therefrom, means for moving and guiding the traveler along a path including an array of contacting elements each element having a supporting branch secured to a base at the station and a contacting branch projecting from said supporting branch into the path of a corresponding terminal pin, whereby upon contact with a terminal pin each said contacting branch deflects thereby creating a torsional force in said supporting branch that opposes the deflection of said contacting branch, said torsional force restoring said contacting branch to its undeflected position upon the passing of said terminal pin and each of said contacting elements being secured to said base at a point where, when said device is at said station, the horizontal distance of each supporting branch to the corresponding terminal pin is slightly less than the length of the respective contacting branch whereby each terminal pin is simultaneously in contact with a respective one of said contacting elements.

References Cited in the file of this patent
UNITED STATES PATENTS

| | | |
|---|---|---|
| 568,205 | Norden | Sept. 22, 1896 |
| 1,832,948 | Schmidt | Nov. 24, 1931 |
| 2,615,081 | Hoff | Oct. 21, 1952 |
| 2,865,003 | Harmon | Dec. 16, 1958 |
| 3,039,058 | Huband et al. | June 12, 1962 |